3,378,523
BISPHENOL POLYESTERS CONTAINING PHOSPHORUS
John R. Caldwell and Winston J. Jackson, Jr., Kingsport, Tenn., assignors to Eastman Kodak Company, Rochester, N.Y., a corporation of New Jersey
No Drawing. Filed Sept. 14, 1961, Ser. No. 137,978
14 Claims. (Cl. 260—47)

This invention relates to linear thermoplastic bisphenol polyesters containing phosphorus. More particularly the invention relates to synthesis of new bisphenol polyesters containing polycondensation residues of phosphorus dichlorides.

An object is to provide novel high molecular weight polyesters containing recurring units which are polycondensation residues of phosphorus dichlorides.

Another object is to provide a process for producing such polyesters. A particular object is to provide novel thermoplastic linear bisphenol polyesters containing phosphorus which lends fire-retarding properties, and to provide methods for synthesis of such polyesters.

Linear polyesters from organophosphonic acid dichlorides and various diols are described in the literature. U.S. Patents 2,716,101 and 2,926,145 describe some of these. We have found that new and useful thermoplastic copolyesters can be synthesized by interfacial polycondensation procedures similar to the procedures described by P. W. Morgan in Society of Plastics Engineers Journal 15, 485–495. The new polyesters contain polycondensation residues of a member selected from the group consisting of phosphorus dichlorides having the following general formulas:

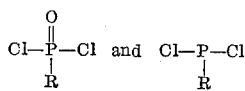

wherein R represents a member selected from the group consisting of alkyl, aryl, alicyclic, alkoxy, aryloxy, amino, alkylamino, and arylamino radicals. These dichlorides react as diacid chlorides in an interfacial polycondensation reaction with bisphenols the same as phosgene and organic diacid chlorides are known to react; that is by polyesterification with the bisphenol yielding a polymer and HCl by-product. In our copending application Ser. No. 137,980, now abandoned, entitled "Bisphenol Polyesters" filed of even date herewith, we have described in detail synthesis of a large number of bisphenol polycarbonates and copolycarbonates by interfacial polycondensation of diacid chlorides (phosgene, diol bischloroformates and dicarboxylic acid chlorides) with various bisphenols, including novel bisphenols. The processes described there are sometimes called "interfacial polycondensation" and are essentially the same as those used for synthesis of the bisphenol polyesters according to this invention except for the difference in the diacid chloride reagents used. According to this invention, bisphenol polyesters are prepared by interfacial polycondensation methods using a mixture of diacid chlorides including a member selected from the group of phosphorus dichlorides described above. Presence of the phosphorus residue in minor proportions in the polymer chain lends fire-retarding properties to the polymer. These phosphorus dichlorides are generally soluble in methylene chloride so they are amenable to the known interfacial polycondensation techniques. We have found that useful copolymers of high molecular weight can be prepared using from 0.2 to 0.5 mole of one of the phosphorus containing dichlorides described above per mole of bisphenol, the remainder of the diacid chloride for the reaction being either phosgene or a diol bischloroformate. The diacid chlorides (including the phosphorus-containing dichlorides) are dissolved in the water-immiscible organic solvent phase of a two-phase interfacial polycondensation reaction mixture. The second phase of the mixture consists of an alkaline aqueous phase in which the bisphenol is dissolved. Preferably a catalyst is present. When the reaction mixture is stirred the polymer forms at the interface of the two immiscible phases by a polycondensation reaction of the diacid chlorides with the bisphenol. Preferably the reaction temperature is maintained at about 15–20° C. Suitable diol bischloroformates and bisphenols for the interfacial polycondensation reactions are generally those which are suitable for polycarbonate syntheses such as those described in the literature and in our copending application mentioned above. The bisphenol may contain two hydroxy groups in one aromatic ring such as hydroquinone, or the hydroxy groups may be on different rings such as in 4,4′-dihydroxydiphenyl. The two hydroxy groups may be on separate aromatic rings attached to a bivalent radical such as alkyl, aryl, cycloalkyl, —O—, —O—CH$_2$—CH$_2$—O—, —S—, —SO$_2$—, —SO$_2$NR—, —NR—, —CONH—,

—COCO—, —CF$_2$—, —NRNR—, alkylene, acetylene, phenylene, xylylene, cyclohexylene, etc. Preferred bisphenols are the 4,4′-bisphenols of gem bivalent alkyl and cycloalkyl radicals.

In synthesis of the copolyesters of the invention it is preferable to add the phosphorus containing dichlorides to the reaction mixture several minutes before introducing the other diacid chlorides.

When a bischloroformate is added, the molar amount of the bisphenol should be equal to, or in slight excess (5 mole percent) of, the combined molar amounts of bischloroformate plus phosphorus dichloride compound. When phosgene is added, there should be preferably a 5 to 10 mole percent excess of phosphorus dichloride compound plus phosgene over the bisphenol. Other water-immiscible solvents, such as benzene, toluene, and tetrachloroethane can be used as the water-immiscible solvent but methylene chloride is preferred. In the aqueous phase, sodium hydroxide or other alkali metal hydroxides may be used. A catalyst such as a quaternary ammonium salt or hydroxide increases the rate of polymerization and is preferred but is not necessary to the reaction. The preferred temperature range for the reaction is 15–20° C. Lower temperatures can be used but are inconvenient and a longer reaction time is required. Higher temperatures can be used but often the molecular weight of the polymer is lower due to the increased hydrolysis at the higher temperature. When the optimum molecular weight of the polymer is attained, the reaction is stopped by neutralizing the alkali remaining in the reaction mixture with an excess of acetic acid. If the final polymer is dissolved in the methylene chloride phase, this layer is diluted with more methylene chloride and then washed with water. Then the polymer is precipitated by slow addition of isopropyl acetate, isopropanol or other non-solvent. If the final polymer is insoluble in the reaction mixture, the precipitate is collected, washed with water, and dried. The polymerization may be carried out in a tertiary amine such as pyridine or triethylamine, but this method is not preferred. The following examples illustrate specific embodiments of the invention.

EXAMPLE I

To a stirred, coled solution containing 11.4 g. (0.28 mole) of sodium hydroxide (98%), 120 ml. of deionized water, 1 g. of benzyltriethylammonium hydroxide, and 22.8 g. (0.10 mole) of bisphenol A [4,4′-(2-isopropylidene)diphenol] wa added 7.8 g. (0.040 mole) of phenylphophonic dichloride ($C_6H_5POCl_2$) in 40 ml. of methylene chloride at such a rate that the temperature remained at 15–20° C. The mixture was stirred for 5 minutes, and then 6.8 g. (0.068 mole) of phosgene (measured as the lecture bottle weight loss) was bubbled into the stirred mixture (temperature held at 15–20° C.). While the reaction mixture was rapidly stirred for 1½ hours, the lower methylene chloride layer slowly became extremely thick and viscous. It was diluted with methylene chloride, neutralized with acetic acid, and washed with water. The polymer was precipitated as small white particles by slowly adding isopropyl acetate to the stirred methylene chloride solution. The polymer had an inherent viscosity of 0.92 and a melting point of 190–200° C. The phosphorus analysis was 4.0 percent (calculated, 4.2). A film, cast from methylene chloride, was self-extinguishing when ignited.

EXAMPLE II

A polymer was prepared from 0.10 mole of 4,4′-(2-norcamphanylidene)diphenol, 0.050 mole of phenylphosphonic dichloride ($C_6H_5POCl_2$), and 0.060 mole of phosgene by the procedure of Example I. A polymer was obtained which softened at 240–260° C. and had an inherent viscosity of 0.84. Phosphorus analysis: calculated 4.4, found 4.35. A film, cast from methylene chloride, was self-extinguishing.

EXAMPLE III

To a stirred, cooled solution containing 8.6 g. (0.21 mole) of sodium hydroxide (98%), 120 ml. of deionized water, 1 g. of benzyltriethylammonium chloride, and 31.3 g. (0.105 mole) of 4,4′-(2-norcamphanylidene)diphenol hydrate was added 8.5 g. (0.040 mole) of phenyl phosphorodichloridate ($C_6H_5OPOCl_2$) in 20 ml. of methylene chloride at such a rate that the temperature remained at 15–20° C. The mixture was stirred for 5 minutes, and then a solution containing 15.2 g. (0.060 mole) of 2,5-norcamphanediol bischloroformate in 30 ml. of ethylene dichloride was added. The mixture was rapidly stirred at 15–20° C. until the lower layer became quite viscous. Then 50 ml. more of methylene chloride was added and stirring continued until the lower layer became thick. Total reaction time was about 2 hours. The reaction mixture was worked up as described in Example I. The polymer had an inherent viscosity of 1.24 and a melting point of 240–250° C. A film, cast from methylene chloride, exhibited substantially improved resistance to burning, compared with a similar polyester containing no phosphorus.

EXAMPLE IV

A polymer prepared as in Example III from 4,4′-sulfonyl diphenol, 0.04 mole of phenylphosphonous dichloride ($C_6H_5PCl_2$), and 0.06 mole of 1,6-hexanediol bischloroformate, melted at 200–210° C. and had an inherent viscosity of 0.52.

EXAMPLE V

A polymer prepared as in Example III from 4,4′-dihydroxy diphenyl, 0.03 mole of phenylphosphorodichloridite ($C_6H_5 OPCl_2$), and 0.07 mole of bischloroformate of triethylene glycol melted at 170–180° C. and had an inherent viscosity of 0.59.

EXAMPLE VI

A polymer prepared as in Example III from 2,2-(4,4′-dihydroxy-3,3′,5,5′,-tetrachlorodiphenyl) propane, 0.02 mole of dimethylphosphoramidic dichloride $$(CH_3)_2NPOCl_2$$

and 0.08 mole of 1,4-cyclohexanedimethanol bischloroformate, melted at 185–195° C. and had an inherent viscosity of 0.82.

EXAMPLE VII

A polymer prepared as in Example III from 4,4′-dihydroxybenzophenone, 0.02 mole of ethylphosphonic dichloride ($C_2H_5POCl_2$), and 0.08 mole of 1,4-butynediol bischloroformate, melted at 190–200° C. and had an inherent viscosity of 0.94.

EXAMPLE VIII

To 22.8 g. (0.10 mole) of Bisphenol A dissolved in a solution containing 100 ml. of dry triethylamine and 100 ml. of methylene chloride was slowly added 7.8 g. (0.040 mole) of phenylphosphonic dichloride while stirring and cooling to 20° C. Phosgene was then passed into the solution until 6.0 g. (0.06 mole) had been used. The mixture was diluted with methylene chloride and washed several times with water to remove the amine hydrochloride and excess amine. The methylene chloride solution was then slowly added to stirred isopropanol to precipitate the polymer. After drying the polymer melted at 190–200° C. and had an inherent viscosity of 0.52. A film cast from methylene chloride was self-extinguishing when ignited.

In a preferred embodiment of the invention, the bisphenol used is a diphenol of a polycyclic gem-bivalent radical containing an atomic-bridged hydrocarbon ring member. These bisphenols are described in our copending application entitled Bisphenol Polyesters filed of even date herewith. Included among such bisphenols, and described in said copending application, are bisphenols having the general formula:

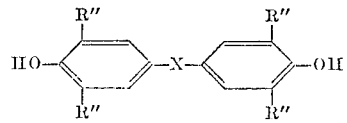

wherein R″ is a member selected from the group consisting of hydrogen atoms, alkyl groups containing from 1 to 4 carbon atoms, and halogen atoms and X is a gem-bivalent radical selected from the group consisting of radicals having the following general formulas:

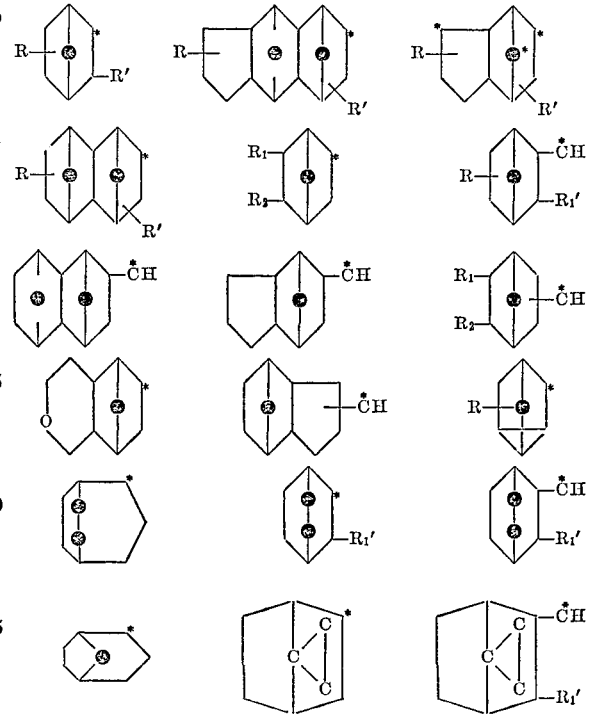

where R is at least one member selected from the group consisting of hydrogen atoms, halogen atoms and alkyl groups containing from 1 to 4 carbon atoms, R′ is a member selected from the group consisting of hydrogen atoms, halogen atoms and alkyl groups containing from 1 to 4 carbon atoms, $R_1$ and $R_2$ are members selected from the group consisting of hydrogen atoms, halogen atoms and alkyl groups containing from 1 to 4 carbon atoms and aryl groups and $R_1'$ is a member selected from the group consisting of hydrogen atoms, halogen atoms, aryl groups, and alkyl groups containing from 1 to 4 carbon atoms, and one of the carbon positions marked by an asterisk is the position of the single carbon atom at which the phenyl groups are joined to the radical.

Polymers prepared from these bisphenols by the process of the invention produce resins having markedly higher melting points than similar resins prepared using other known bisphenols. We have found that the diphenols of the gem-bivalent polycyclic radicals containing atomic-bridged hydrocarbon rings impart high melting points and high second-order transition temperatures to the copolymers prepared by the process of the invention in which they are used as the bisphenol component.

EXAMPLE IX

A polymer was prepared from 0.10 mole of 4,4'-(decahydro - 1,4 - exo-endo-5,8-dimethanonaph-2-ylidene)diphenol, 0.30 mole of phenyl phosphorodichloridate

and 0.84 mole of phosgene according to the procedure of Example I but using 6 drops of tri-n-butylamine as catalyst. The polymer had an inherent viscosity of 0.92 and softened at 285–300° C. A film, cast from methylene chloride, had good resistance to burning.

EXAMPLE X

A polymer was prepared from 0.10 mole of 4,4'-(3-methyl-2-norcamphanylmethylene)diphenol, 0.03 mole of dimethylphosphoramidic dichloride [$(CH_3)_2NPOCl_2$], and 0.08 mole of phosgene according to the procedure of Example I but using 6 drops of tri-n-butylamine as catalyst. The polymer had an inherent viscosity of 0.87 and softened at 240–260° C. It had good resistance to burning.

EXAMPLE XI

A polymer was prepared from 0.10 mole of 4,4'-(tricyclo - [2.2.1.0$^{2,6}$]heptan-3-ylidene)diphenol, 0.045 mole of ethylphosphonic dichloride ($C_2H_5POCl_2$), and 0.07 mole of phosgene according to the procedure of Example I. The polymer had an inherent viscosity of 0.77 and softened at 270–285° C. It had good resistance to burning.

EXAMPLE XII

A polymer was prepared from 0.10 mole of 4,4'-(decahydro-1,1-naphthylidene)diphenol, 0.03 mole of propylphosphonic dichloride ($C_3H_7POCl_2$), and 0.085 mole of phosgene according to the procedure of Example I. The polymer had an inherent viscosity of 0.79 and softened at 230–250° C. It had good resistance to burning.

The polyesters of the invention are useful for making fibers, photographic film base, and other molded and extruded objects by known techniques for working thermoplastic polymers. Objects made from these particular polyesters will have the advantage of the fire-retarding properties lent by the phosphorus present.

In the polycondensation reaction the diacid chlorides surrender two chlorine atoms and the bisphenol surrenders two hydrogen atoms to produce the polyester and HCl by-product. Residues of the bisphenol (HO—R—OH)

monomers occur as units of (O—R—O) in the polymer. Residues of the diacid chloride (Cl—X—Cl) monomers occur as units of (X) in the polymer. Of course, the diacid chloride and bisphenol residues always alternate in the polyester. Mixed diacid chloride residues will be randomly dispersed in the polymer chain. The phosphorus dichlorides described are included in the term "diacid chloride" as used herein because they react as such in the polycondensation reaction. Because of certain complexities of phosphorus chemistry we prefer to define the copolyesters as consisting of polycondensation residues of the defined diacid chloride and bisphenols, rather than as polyesters of the corresponding diacids and bisphenols.

In the above description specific examples are given to illustrate specific embodiments of the invention and should not be construed to limit the scope of the invention as defined in the following claims.

We claim:

1. A method for producing a thermoplastic linear copolyester comprising intimately mixing two immiscible phases of an interfacial polycondensation reaction mixture, said reaction mixture comprising a bisphenol suspended in an alkaline aqueous phase and a mixture of organic diacid chlorides dissolved in a water-immiscible organic solvent phase, said mixture of diacid chlorides consisting of from 50 to 80 mole percent of at least one diacid chloride selected from the group consisting of phosgene and diol bischloroformates and from 20 to 50 mole percent of a member selected from the group consisting of phosphorus dichlorides having the general formulas:

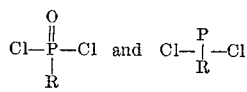

wherein R is a radical selected from the group consisting of alkyl, aryl, alicyclic, alkoxy, aryloxy, amino, alkylamino, and arylamino radicals.

2. A thermoplastic linear polyester consisting of alternately recurring units which are polycondensation residues of a mixture of diacid chlorides and alternately recurring units which are polycondensation residues of a bisphenol, said residues of a mixture of diacid chlorides consisting of from 80 to 50 mole percent of polycondensation residues of at least one diacid chloride selected from the group consisting of phosgene and diol bischloroformates and from 20 to 50 mole percent of polycondensation residues of a member selected from the group consisting of phosphorus dichlorides having the general formulas:

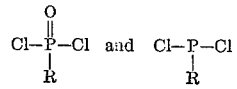

wherein R is a radical selected from the group consisting of alkyl, aryl, alicyclic, alkoxy, aryloxy, amino, alkylamino and arylamino radicals.

3. The polyester of claim 2 wherein said mixture of diacid chlorides consists of phosgene and phenylphosphonic dichloride, and said bisphenol is 4,4'-(2-isopropylidene)diphenol.

4. The polyester of claim 2 wherein said mixture of diacid chlorides consists of phosgene and phenylphosphonic dichloride, and said bisphenol is 4,4'-(2-norcamphanylidene) diphenol.

5. The polyester of claim 2 wherein said mixture of diacid chlorides consists of 2,5-norcamphanediol bischloroformate and phenyl phosphorodichloridate, and said bisphenol is 4,4'-(2-norcamphanylidene) diphenol.

6. The polyester of claim 2 wherein said mixture of diacid chlorides consists of phosgene and phenyl phosphorodichloridate, and said bisphenol is 4,4'-(decahydro-1,4-exo-endo-5,8-dimethanonaph-2-ylidene) diphenol.

7. The polyester of claim 2 wherein said mixture of diacid chlorides consists of phosgene and dimethylphosphoramidic dichloride, and said bisphenol is 4,4'-(3-methyl-2-norcamphanyl-methylene) diphenol.

8. The polyester of claim 2 wherein said mixture of diacid chlorides consists of phosgene and ethylphosphonic dichloride, and said bisphenol is 4,4'-(tricyclo-[2.2.1.0$^{2,6}$] heptan-3-ylidene) diphenol.

9. The polyester of claim 2 wherein said mixture of diacid chlorides consists of phosgene and propylphosphonic dichloride, and said bisphenol is 4,4'-(decahydro-1,1-naphthylidene) diphenol.

10. A method for producing a thermoplastic linear copolyester comprising admixing two organic diacid chlorides with a bisphenol dissolved in a tertiary amine, said diacid chlorides consisting of from 50 to 80 mole percent of at least one diacid chloride selected from the group consisting of phosgene and diol bischloroformates and from 20 to 50 mole percent of a member selected from the group consisting of phosphorus dichlorides having the general formulas:

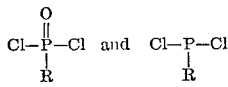

wherein R is a radical selected from the group consisting of alkyl, aryl, alicyclic, alkoxy, aryloxy, amino, alkylamino, and arylamino radicals.

11. The method of claim 10 wherein said tertiary amine is triethylamine.

12. The method of claim 10 wherein said organic diacid chlorides are phosgene and phenylphosphonic acid, and said bisphenol is 4,4'-(2-isopropylidene) diphenol.

13. The method of claim 1 wherein said mixture of diacid chlorides consists of phosgene and phenylphosphonic dichloride, and said bisphenol is 4,4'-(2-isopropylidene) diphenol.

14. A flame-resistant, linear, resinous polymer containing recurring units of the formulae:

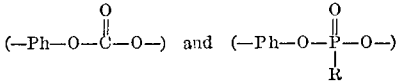

wherein Ph is the divalent residue of a bisphenol and R is a monovalent hydrocarbon radical.

References Cited

UNITED STATES PATENTS

| | | | |
|---|---|---|---|
| 2,743,258 | 4/1956 | Coover | 260—47 |
| 2,900,365 | 8/1959 | Haven | 260—47 |
| 2,682,521 | 6/1954 | Coover | 260—49 |
| 3,054,772 | 9/1962 | Schnell | 260—47 X |

OTHER REFERENCES

"J. Poly. Sci.," vol. 40, pp. 399–406 (1959).

SAMUEL H. BLECH, *Primary Examiner.*

H. N. BURSTEIN, MURRAY TILLMAN, *Examiners.*

J. C. MARTIN, *Assistant Examiner.*

UNITED STATES PATENT OFFICE
CERTIFICATE OF CORRECTION

Patent No. 3,378,523 　　　　　　　　　　　　　　April 16, 1968

John R. Caldwell et al.

It is certified that error appears in the above identified patent and that said Letters Patent are hereby corrected as shown below:

Column 2, line 67, "coled" should read -- cooled --; line 71, "wa" should read -- was --. Column 3, line 1, "phophonic" should read -- phosphonic --. Column 4, lines 40 to 44, the second formula should appear as shown below:

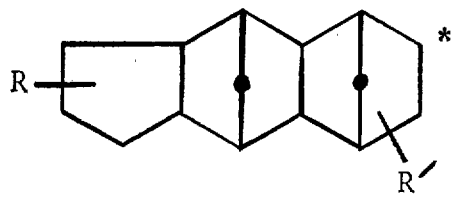

same column 4, lines 49 to 53, the first formula should appear as shown below:

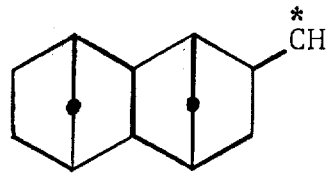

same column 4, lines 54 to 58, the first formula should appear as shown below:

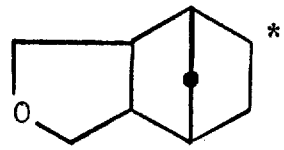

3,378,523

(2)

Column 6, lines 24 to 27, the right-hand formula should appear as shown below:

$$\underset{R}{Cl-\underset{|}{P}-Cl}$$

Signed and sealed this 24th day of February 1970.

(SEAL)
Attest:

EDWARD M. FLETCHER, JR.
Attesting Officer

WILLIAM E. SCHUYLER, JR.
Commissioner of Patents